US010332092B2

(12) United States Patent
Tsuchida et al.

(10) Patent No.: US 10,332,092 B2
(45) Date of Patent: Jun. 25, 2019

(54) INFORMATION OUTPUT CONTROL APPARATUS AND POINT-OF-SALE SYSTEM

(71) Applicant: TOSHIBA TEC KABUSHIKI KAISHA, Tokyo (JP)

(72) Inventors: Sunao Tsuchida, Mishima Shizuoka (JP); Sadatoshi Oishi, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/593,666

(22) Filed: May 12, 2017

(65) Prior Publication Data

US 2017/0249618 A1    Aug. 31, 2017

Related U.S. Application Data

(63) Continuation of application No. 15/008,147, filed on Jan. 27, 2016, now Pat. No. 9,684,895.

(30) Foreign Application Priority Data

Jan. 30, 2015   (JP) ................................. 2015-017447

(51) Int. Cl.
*G06F 17/00*     (2006.01)
*G06Q 20/20*     (2012.01)
(Continued)

(52) U.S. Cl.
CPC ......... *G06Q 20/208* (2013.01); *G06K 7/1413* (2013.01); *G06K 19/06028* (2013.01); *G06Q 20/209* (2013.01); *G07G 1/0081* (2013.01)

(58) Field of Classification Search
CPC ...... G06Q 20/209; G06Q 20/20; H04N 1/001; G06K 7/1404; G07G 1/0018
(Continued)

(56) References Cited

U.S. PATENT DOCUMENTS 5,468,942 A * 11/1995 Oosterveen ........ G06K 7/10881
                                                           186/52
5,557,088 A *  9/1996 Shimizu ............... G06Q 20/343
                                                           235/383
(Continued)

FOREIGN PATENT DOCUMENTS

JP         H11-283126 A      10/1999
JP         2011-098828 A      5/2011
(Continued)

OTHER PUBLICATIONS

Dave Sacerdote, "Stop & Shop says Scan It!", Apr. 14, 2009, http://davescupboard.blogspot.com/2009/04/stop-shop-says-scan-it.html, p. 1.*

(Continued)

*Primary Examiner* — Paultep Savusdiphol
(74) *Attorney, Agent, or Firm* — Kim & Stewart LLP

(57) ABSTRACT

An information processing system includes a code reader, an information processing apparatus configured to receive codes read by the code reader, and a first printer in communication with the information processing apparatus. Upon receiving a first code which indicates printing information and a second code which indicates a target printer, the information processing apparatus selects the target printer indicated by the second code, and transmits the printing information indicated by the first code to the target printer. The first printer receives from the information processing apparatus the printing information and prints the printing information, when the first printer is indicated by the second code as the target printer.

6 Claims, 7 Drawing Sheets

(51) Int. Cl.
  *G06K 7/14* (2006.01)
  *G06K 19/06* (2006.01)
  *G07G 1/00* (2006.01)
(58) Field of Classification Search
  USPC .................................................. 235/383, 375
  See application file for complete search history.

(56) References Cited

U.S. PATENT DOCUMENTS

| | | | | |
|---|---|---|---|---|
| 5,825,002 | A * | 10/1998 | Roslak | G06K 17/00 235/375 |
| 7,010,501 | B1 * | 3/2006 | Roslak | G06Q 20/20 705/23 |
| 7,107,221 | B1 * | 9/2006 | Tracy | G06Q 20/20 705/26.81 |
| 7,278,579 | B2 | 10/2007 | Loffredo et al. | |
| 8,363,247 | B2 | 1/2013 | Butcher | |
| 2002/0050526 | A1 * | 5/2002 | Swartz | G06K 17/00 235/472.02 |
| 2005/0259797 | A1 * | 11/2005 | Swartz | G06K 7/10881 379/93.12 |
| 2006/0180659 | A1 | 8/2006 | Loffredo et al. | |
| 2010/0172680 | A1 | 7/2010 | Butcher | |
| 2014/0008430 | A1 | 1/2014 | Soule, III et al. | |

FOREIGN PATENT DOCUMENTS

| | | |
|---|---|---|
| JP | 2014-032454 A | 2/2014 |
| JP | 2014-085904 | 5/2014 |

OTHER PUBLICATIONS

Takashi JP 2011098828—Machine translation retrieved from Espacenet.com on Jul. 6, 2018, pp. 1-34.*
Japanese Office Action dated Jun. 20, 2017, filed in counterpart Japanese Patent Application No. 2015-017447 (7 pages) (with machine translation).
Notification of Reasons for Refusal dated Jul. 31, 2018 in corresponding Japanese Patent Application No. 2017-195223 with English translation, 6 pages.

* cited by examiner

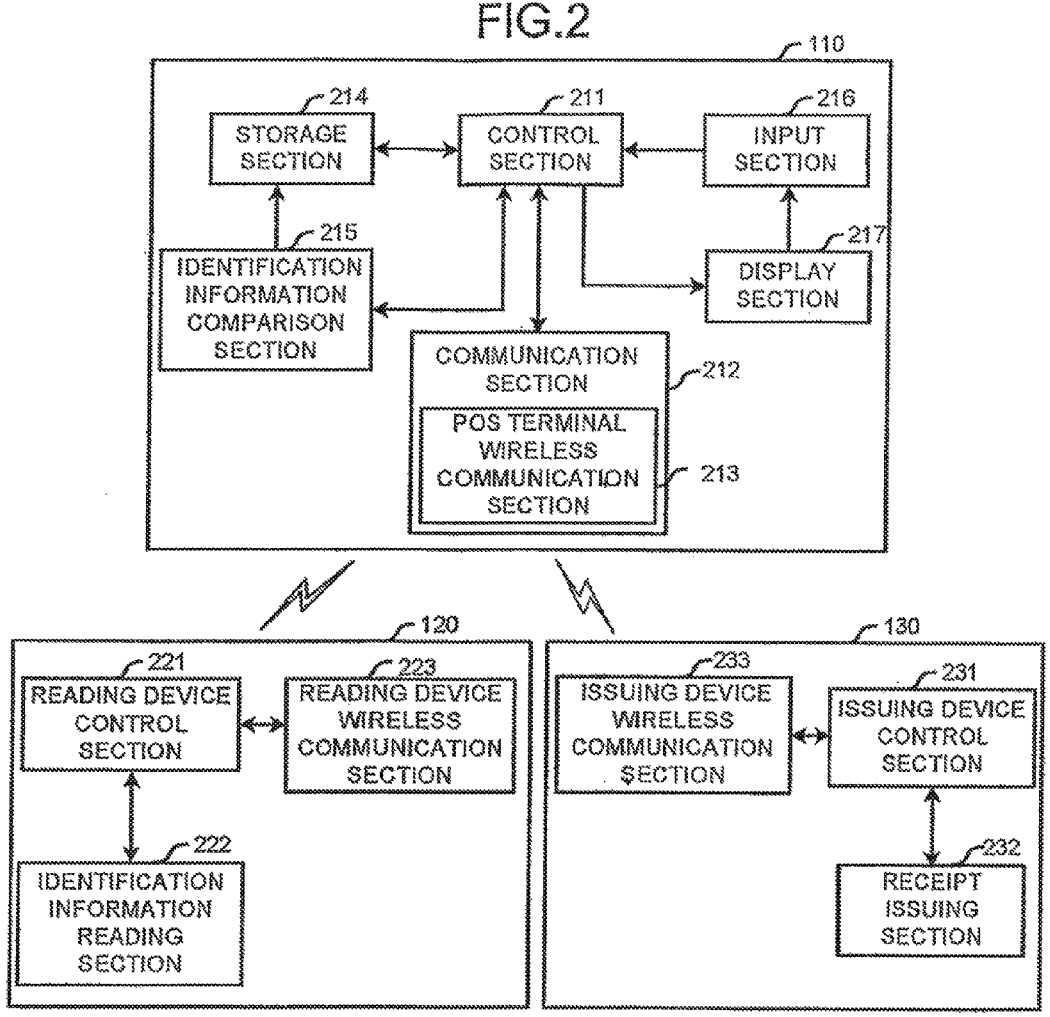

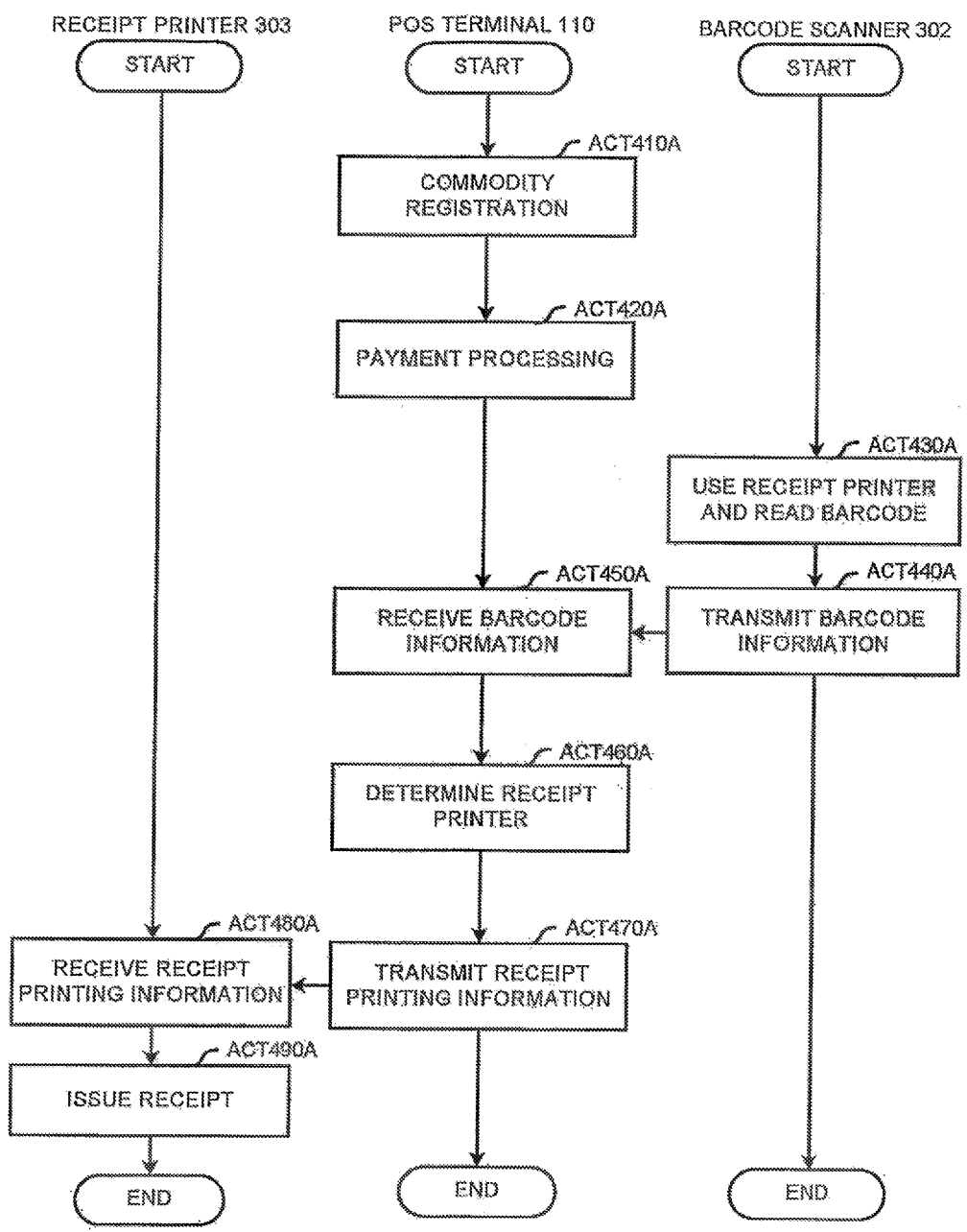

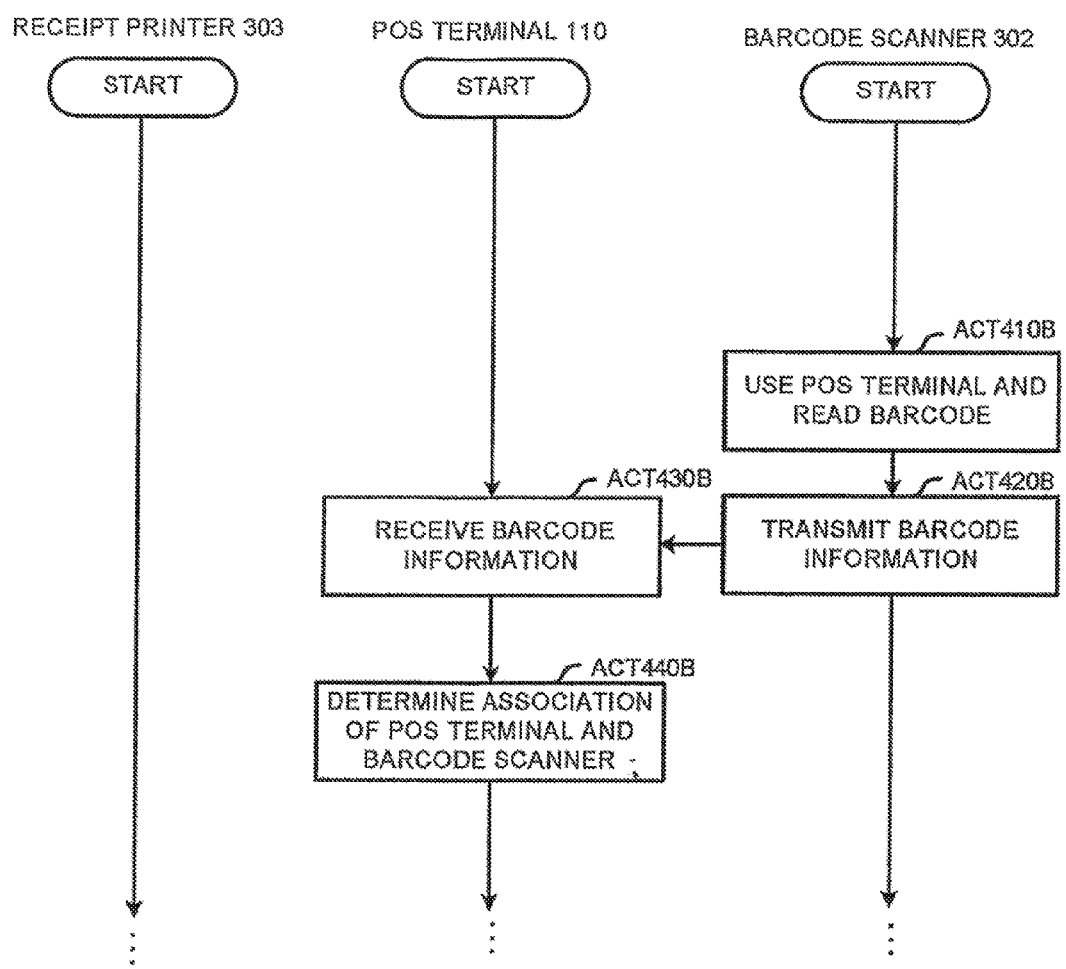

FIG.5A

IDENTIFICATION INFORMATION TABLE T1

| IDENTIFICATION INFORMATION 1a | DEVICE ID OF RECEIPT ISSUING DEVICE 130a (DEVICE ID OF RECEIPT PRINTER 303a) |
|---|---|
| IDENTIFICATION INFORMATION 1b | DEVICE ID OF RECEIPT ISSUING DEVICE 130b (DEVICE ID OF RECEIPT PRINTER 303b) |
| ... | ... |
| IDENTIFICATION INFORMATION 2a | INFORMATION RELATING TO COMMODITY A (PRICE, COMMODITY NAME AND THE LIKE) |
| IDENTIFICATION INFORMATION 2b | INFORMATION RELATING TO COMMODITY B (PRICE, COMMODITY NAME AND THE LIKE) |
| ... | ... |

FIG.5B

IDENTIFICATION INFORMATION TABLE T2

| IDENTIFICATION INFORMATION 1a | DEVICE ID OF RECEIPT ISSUING DEVICE 130a (DEVICE ID OF RECEIPT PRINTER 303a) |
|---|---|
| IDENTIFICATION INFORMATION 1b | DEVICE ID OF RECEIPT ISSUING DEVICE 130b (DEVICE ID OF RECEIPT PRINTER 303b) |
| ... | ... |
| IDENTIFICATION INFORMATION 2a | INFORMATION RELATING TO COMMODITY A (PRICE, COMMODITY NAME AND THE LIKE) |
| IDENTIFICATION INFORMATION 2b | INFORMATION RELATING TO COMMODITY B (PRICE, COMMODITY NAME AND THE LIKE) |
| ... | ... |
| IDENTIFICATION INFORMATION 3a | DEVICE ID OF POS TERMINAL 110a |
| IDENTIFICATION INFORMATION 3b | DEVICE ID OF POS TERMINAL 110b |
| ... | ... |

US 10,332,092 B2

INFORMATION OUTPUT CONTROL APPARATUS AND POINT-OF-SALE SYSTEM

CROSS-REFERENCE TO RELATED APPLICATIONS

This application is a continuation of U.S. patent application Ser. No. 15/008,147, filed on Jan. 27, 2016, which is based upon and claims the benefit of priority from Japanese Patent Application No. 2015-017447, filed on Jan. 30, 2015, the entire contents of each of which are incorporated herein by reference.

FIELD

Embodiments described herein relate generally to an information output control apparatus and point-of-sale system.

BACKGROUND

In recent years, a POS (Point Of Sales) system has become commonplace and used in a store that sells products and services. In one example, the POS system comprises a POS terminal and a plurality of peripheral devices which are connected with each other in a wired or wireless manner. These peripheral devices include, for example, a barcode scanner and a receipt issuing device.

In the POS system, the POS terminal (host device) communicates with the receipt issuing device (recording device) and a receipt is issued through the receipt issuing device.

DESCRIPTION OF THE DRAWINGS

FIG. 2 is a block diagram illustrating functional components of a POS terminal, an identification information reading device and a receipt issuing device.

FIG. 4A is a flowchart illustrating an example of an operation for issuing a receipt according to the embodiment.

FIG. 4B is a flowchart illustrating an example of a processing communications between a reading device and the POS terminal according to the embodiment.

FIG. 5A is a table for associating each of different identification information with device identifiers for receipt issuing devices or with commodity information.

FIG. 5B is a table for associating each of different identification information with device identifiers for receipt issuing devices, with commodity information, or with device identifiers for POS terminals.

DETAILED DESCRIPTION

According to an embodiment, an information processing system includes a code reader, an information processing apparatus configured to receive codes read by the code reader, and a first printer in communication with the information processing apparatus. Upon receiving a first code which indicates printing information and a second code which indicates a target printer, the information processing apparatus selects the target printer indicated by the second code, and transmits the printing information indicated by the first code to the target printer. The first printer receives from the information processing apparatus the printing information and prints the printing information, when the first printer is indicated by the second code as the target printer.

Figure 1:
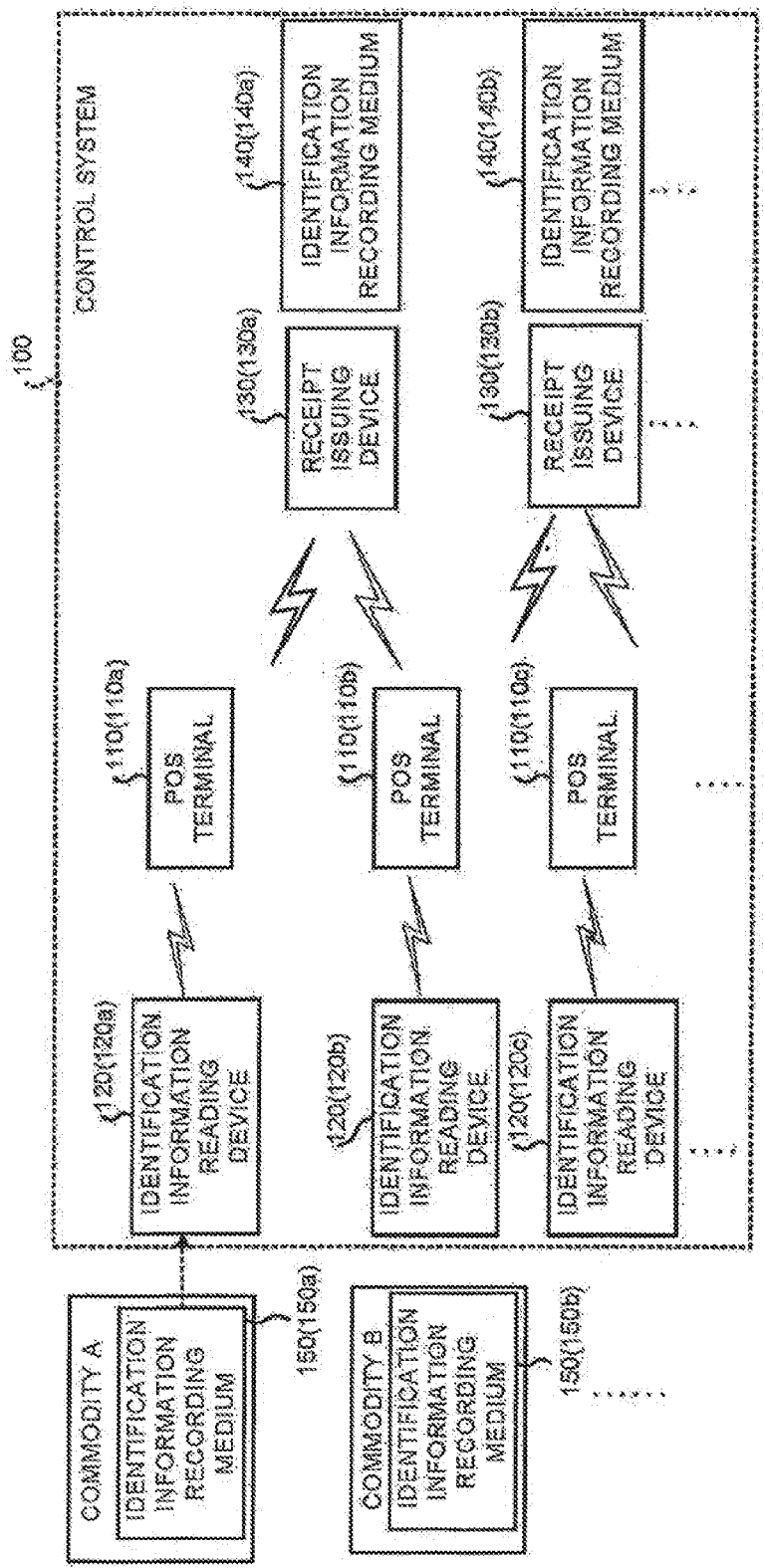
FIG. 1 is a diagram illustrating an example layout of a control system according to an embodiment.

Hereinafter, the embodiment is described with reference to the accompanying drawings. FIG. 1 shows an example layout of a control system 100 (information output control system) according to the present embodiment.

For example, the control system 100 comprises a plurality of POS terminals 110 (110a, 110b, 110c, . . . ) as the information processing apparatuses, a plurality of identification information reading devices 120 (120a, 120b, 120c, . . . ) and a plurality of receipt issuing devices 130 (130a, 130b, . . . ) as the information output devices. For example, one POS terminal 110a and one identification information reading device 120a are wirelessly connected with each other, and one POS terminal 110a and one receipt issuing device 130a are wirelessly connected with each other. Even in a case of connecting each of devices in a wired manner or in a case of connecting some of these devices in a wired manner, an information output control processing described hereinafter can be applied.

One identification information reading device 120a can wirelessly communicate with one POS terminal 110a associated with the identification information reading device 120a in advance or one POS terminal 110a selected through the reading of identification information, and one POS terminal 110a can wirelessly communicate with one receipt issuing device 130a selected through the reading of identification information. A method of selecting one POS terminal 110a through the reading of the identification information and a method of selecting one receipt issuing device 130a through the reading of the identification information are described below in detail.

The identification information reading device 120 can read identification information recording medium 140 (140a, 140b, used to identify the receipt issuing device 130 and identification information recording medium 150 (150a, 150b, . . . ) used to identify a commodity. Further, the identification information reading device 120 can read identification information recording medium used to identify the POS terminal 110 as described below.

The identification information recording medium 140a includes unique identification information 1a; similarly, the identification information recording medium 150a includes unique identification information 2a; and similarly, the identification information recording medium 305a includes unique identification information 3a. The identification information recording medium 140 is prepared in response to each receipt issuing device 130 to identify each receipt issuing device 130. For example, the identification information recording medium 140a is attached to the receipt issuing device 130a and the identification information recording medium 305a is attached to the POS terminal 110a. The identification information recording medium 150 is prepared in response to each commodity to identify the each commodity. For example, the identification information recording medium 150a is attached to a commodity A and the identification information recording medium 150b is attached to a commodity B.

For example, the identification information reading device 120 reads the identification information 1a from the identification information recording medium 140a and transmits the read identification information 1a to the POS terminal 110a associated in advance or the POS terminal 110a selected through the reading of the identification information. The identification information reading device 120 reads the identification information 2a from the identification information recording medium 150a and transmits the read identification information 2a to the POS terminal 110a associated in advance or the POS terminal 110a selected through the reading of the identification information.

In the present embodiment, the control system 100 that includes a plurality of POS terminals 110, a plurality of identification information reading devices 120 and a plurality of receipt issuing devices 130 is mainly described; however, the control system 100 may be constituted by one POS terminal 110, one identification information reading device 120 and one receipt issuing device 130.

Various devices of the control system 100 of the present embodiment may wirelessly communicate with each other directly or indirectly through an access point. The wireless communication is assumed as a wireless LAN or a Bluetooth®, a ZigBee®, and the like.

In the present embodiment, the control system 100 can be a part of a POS system for executing a checkout processing to be applicable to a store such as a supermarket, a convenience store and a restaurant. It is assumed that the identification information reading device 120 is a portable barcode scanner or a portable RFID (Radio Frequency Identification) reader and that the identification information recording mediums 140, 150, 305 are bar-codes or RFID tags, FIG. 2 is a block diagram illustrating functional components of the POS terminal 110, the identification information reading device 120 and the receipt issuing device 130. The POS terminal 110 includes a communication section 212, a storage section 214, an identification information comparison section 215, an input section 216, a display section 217 and a control section 211 for controlling these sections.

The communication section 212 is a functional block for communicating with various devices and includes a POS terminal wireless communication section 213 that wirelessly communicates with the identification information reading device 120 and the receipt issuing device 130, The storage section 214 stores an identification information table T1 for associating the identification information with price of a commodity or the receipt issuing device 130. For example, as shown in FIG. 5A, the identification information table T1 includes information for associating the identification information 1a with a device ID of the receipt issuing device 130a, associating the identification information 1b with a device ID of the receipt issuing device 130b, associating identification information 2a with information relating to the commodity A (price and name of the commodity) and associating identification information 2b with information relating to the commodity B (price and name of the commodity).

The identification information comparison section 215 compares the identification information with reference to the identification information table T1 stored in the storage section 214 and outputs the comparative result to the control section. For example, the identification information comparison section 215 selects the device ID of the receipt issuing device 130a based on the identification information. 1a and outputs the selected device ID of the receipt issuing device 130a to the control section. Further, the identification information table T1 is stored in an external device, and the POS terminal 110 may transmit the identification information (e.g. identification information 1a) to the external device and receive in response thereto information (e.g. device ID of the receipt issuing device 130a) associated with the transmitted identification information.

A keyboard or various switches are assumed as the input section 216 that outputs input information to the control section 211. The display section 217, which is assumed to be a liquid crystal panel, displays the information input from the control section 211. Further, the POS terminal 110 may not include the input section 216 and the display section 217 and may use an external input device and external output device through the communication section 212.

The identification information reading device 120 includes a reading device control section. 221, an identification information reading section 222 and a reading device wireless communication section 223. The identification information reading section 222 is a functional block for reading identification information and outputs the read identification information to the reading device control section 221. The reading device control section 221 outputs the identification information input from the identification information reading section 222 to the reading device wireless communication section 223. The reading device wireless communication section 223 transmits the input identification information to the POS terminal wireless communication section 213.

The receipt issuing device 130 includes an issuing device control section 231, a receipt issuing section 232 and an issuing device wireless communication section 233. The issuing device wireless communication section 233 receives information transmitted from the POS terminal wireless communication section 213 and outputs the received information to the issuing device control section 231. If the information input from the issuing device wireless communication section 233 is receipt information, the issuing device control section 231 outputs the input information to the receipt issuing section 232 which issues a receipt based on the input information.

Figure 3A:
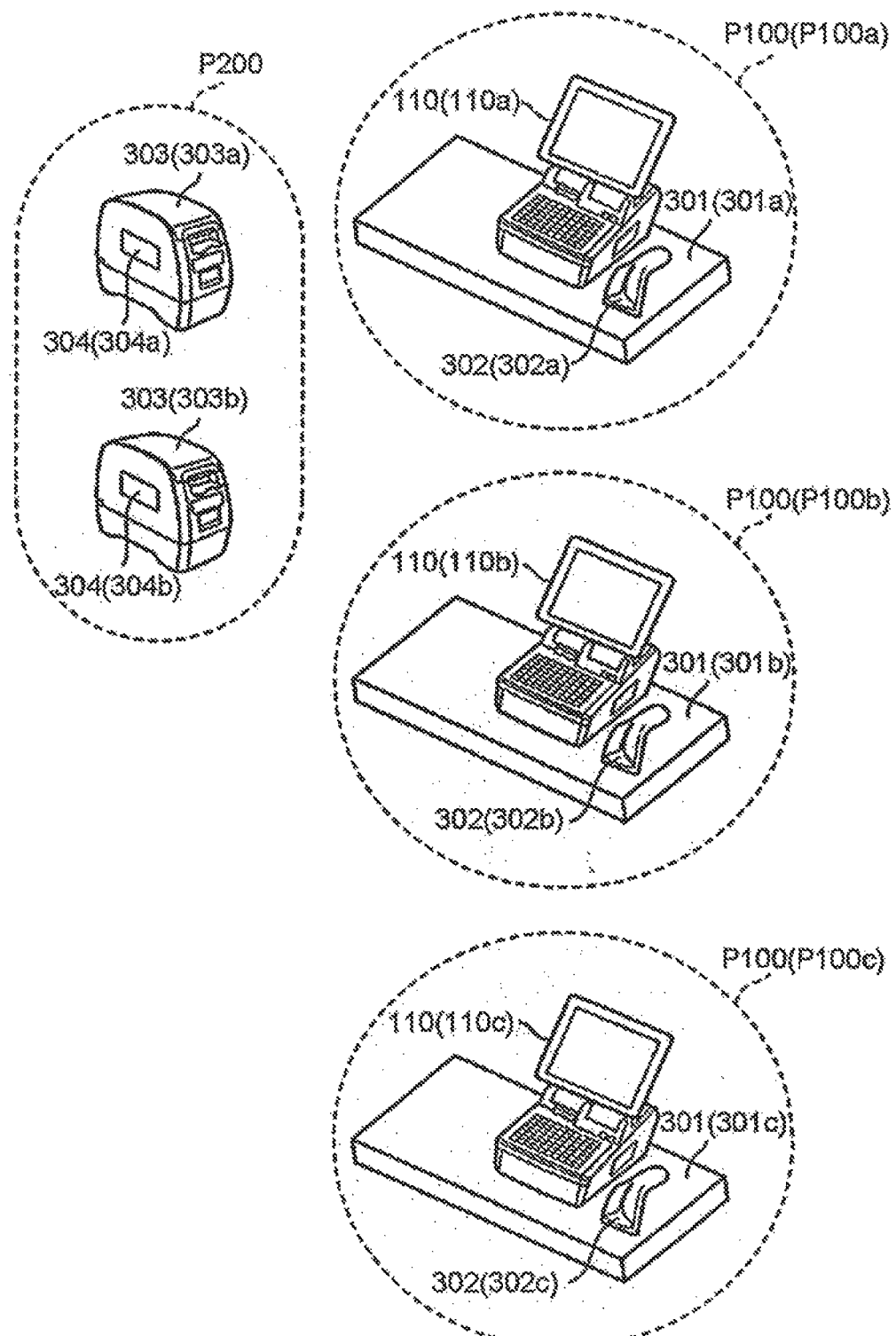
FIGS. 3A-3B illustrate two examples of POS system arrangement in a store.
Figure 3B:
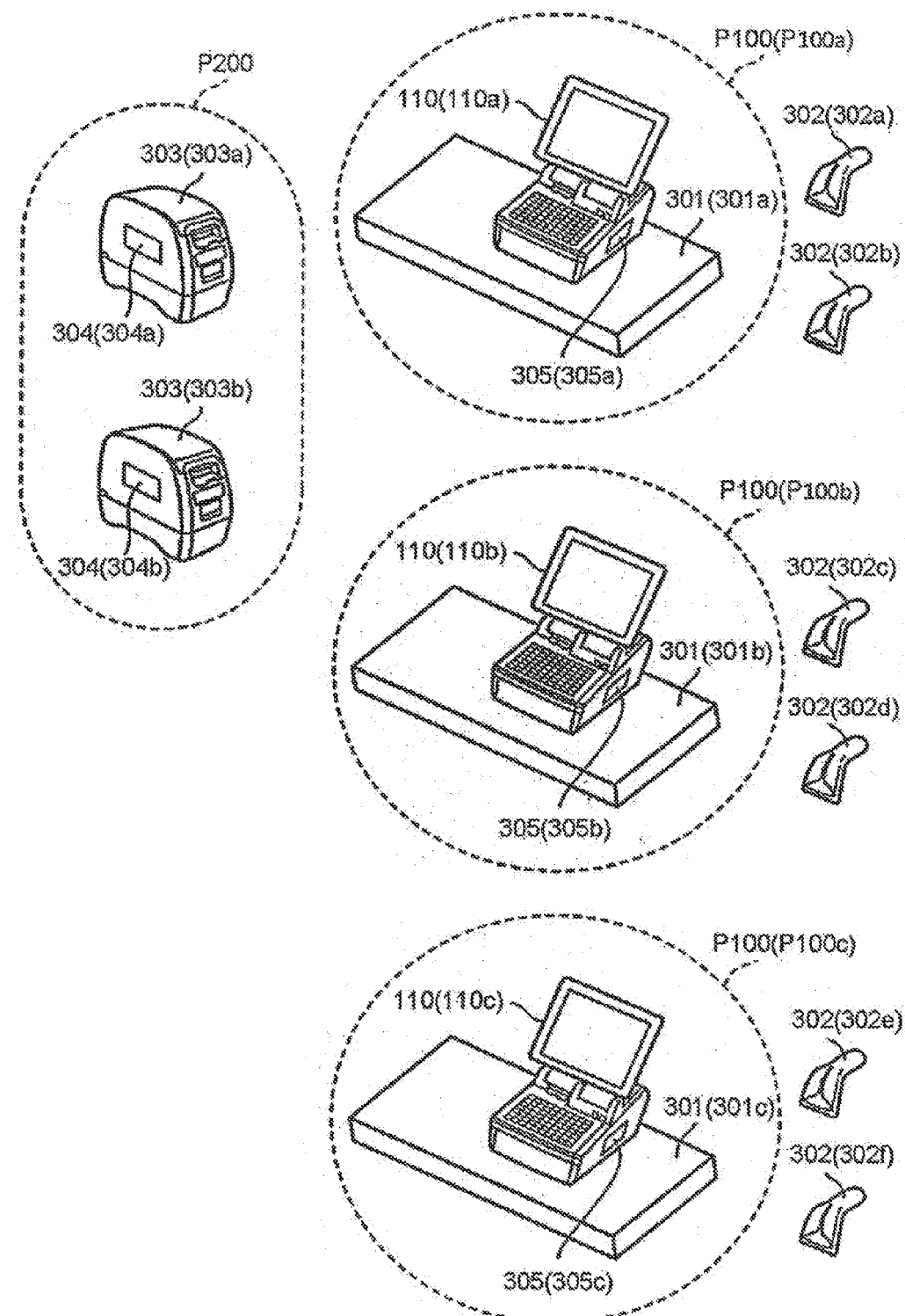

Next, in the case where a shop clerk carries out a checkout processing on commodities desired to be purchased by a shopper, basic operations of a receipt issuing processing are described. In the example shown in FIG. 3A, the identification information reading device 120 (120a, 120b, 120c, . . . ) is described as a barcode scanner 302 (302a, 302b, 302c, . . . ), the receipt issuing device 130 (130a, 130b, 130c, . . . ) is described as a receipt printer 303 (303a, 303b, 303c, . . . ) and the identification information recording medium 140 (140a, 140b, 140c, . . . ) is described as a barcode 304 (304a, 304b, 304c, . . . ). FIG. 3A illustrates one example of the device arrangement in the store. A register counter 301a is arranged at a register setting position P100a, and the POS terminal 110a and the barcode scanner 302a capable of wirelessly communicating with the POS terminal 110a are arranged on the register counter 301a. Similarly, a register counter 301b, the POS terminal 110b and the barcode scanner 302b are arranged at a register setting position P100b, and a register counter 301c, the POS terminal 110c and the barcode scanner 302c are arranged at a register setting position P100c. Further, the barcode scanner 302a is associated with the POS terminal 110a through a previous mutual authentication and it is set that the barcode scanner 302a wirelessly communicates with the POS terminal 110a, which is similar to the relationship between the barcode scanner 302b and the POS terminal 110b and the relationship between the barcode scanner 302c and the POS terminal 110c.

The receipt printers 303a and 303b are arranged at a printer setting position P200. The barcode 304a corresponding to the identification information 1a associated with the receipt printer 303a is attached to the receipt printer 303a, and the barcode 304b corresponding to the identification information 1b associated with the receipt printer 303b is attached to the receipt printer 303b. Even if the barcode 304a is not directly attached to the receipt printer 303a, the barcode 304a may be arranged so that it is understood that the barcode 304a corresponds to the receipt printer 303a. Similarly, the barcode 304b may be arranged so that it is understood that the barcode 304b corresponds to the receipt printer 303b. The association of the receipt printer 303a and the identification information 1a is stored in the storage section 214 of each POS terminal 110 (110a, 110b, . . . ) (refer to the identification information table T1 of FIG. 5A). Similarly, the association of the receipt printer 303b and the identification information 1b is stored in the storage section 214 of each POS terminal 110 (refer to the identification information table T1 of FIG. 5A).

In the example, it is assumed that the distance from the register setting position P100 to the printer setting position P200 is about 5~10 m. Herein, it is described that a shop clerk A carries out the checkout processing at the register setting position P100a.

FIG. 4A is a flowchart illustrating an example of the operations (information output control) of the POS terminal 110, the receipt printer 303 and the barcode scanner 302. The shop clerk. A uses the POS terminal 110a to carry out a commodity registration of commodities desired to be purchased by the shopper (ACT 410A). For example, the shop clerk A uses the barcode scanner 302a to read the identification information recording medium 150 (barcode) attached to the commodity A. The identification information reading section 222 reads barcode information (identification information 2a) from the identification information recording medium 150 attached to the commodity A, and the reading device wireless communication section 223 transmits the identification information 2a to the POS terminal 110a. The PCS terminal 110a (the POS terminal wireless communication section 213) receives the identification information 2a and the storage section 214 stores the identification information 2a. The identification information comparison section 215 compares the identification information table T1 stored in the storage section 214 with the received identification information 2a to derive information relating to the commodity A (e.g. price and commodity name) that corresponds to the received identification information 2a and registers the information relating to the commodity A. Alternatively, the shop clerk A may input the price of the commodity A from the input section 216 of the POS terminal 110a as the registration of the information relating to the commodity A.

If the commodity registration of all commodities are completed, the shop clerk A conveys total amount to the shopper, receives money from the shopper and inputs the received money to the input section 216 of the POS terminal 110a (ACT 420A). Next, the shop clerk. A moves from the register setting position P100a to the printer setting position P200, carrying the barcode scanner 302a. Then, the barcode scanner 302a is used to read the identification information recording medium 140 (barcode) attached to a receipt printer 303 to be used (ACT 430A). Herein, it is assumed that the receipt printer 303a is used, the identification information reading section 222 of the barcode scanner 302a reads the barcode information (identification information 1a) according to the barcode 304a attached to the receipt printer 303a, and the reading device wireless communication section 223 transmits the barcode information (identification information 1a) to the POS terminal 110a (ACT 440A).

The POS terminal wireless communication section 213 receives the barcode information (identification information 1a) (ACT 450A) to determine a receipt printer being used (ACT 460A). That is, the identification information comparison section 215 refers to the identification information table T1 stored in the storage section 214 to derive (select) the receipt printer according to the received barcode information. The barcode information is barcode information (identification information 1a) of the barcode 304a, and thus the receipt printer 303a is derived (selected). The POS terminal 110a transmits receipt printing information (output information) to the receipt printer 303a (ACT 470A).

The issuing device wireless communication section 233 of the receipt printer 303a receives the transmitted receipt printing information (ACT 480A). The issuing device control section 231 of the receipt printer 303a outputs the received receipt printing information to the receipt issuing section 232 to carry out the receipt issuing processing by the receipt issuing section 232 (ACT 490A). Then, the issued receipt is transferred to the shopper from the shop clerk A.

In the next example, it is assumed that the shop clerks A, B and C complete the payment processing (ACT 420A) almost at the same time respectively using the POS terminals 110a, 110b and 110c, and thereafter, the shop clerks A, B and C subsequently move to the printer setting position P200. The shop clerk A who arrives at the printer setting position P200 first uses the barcode scanner 302a to read the barcode 304a. Next, the shop clerk B who moves to the printer setting position P200 second after the shop clerk A, uses the barcode scanner 302b to read the barcode 304b attached to the register printer 303b which is not used by the shop clerk A. Then, the shop clerk C who moves to the printer setting position P200 last, waits until the shop clerk A or B takes the issued receipt, and reads the barcode 304a or 304b attached to the receipt printer 303a or 303b which completed the issue of the receipt to the shop clerk A or B. In this way, even if the payment processing is completed almost at the same time, a plurality of receipts is not issued from one receipt printer 303. Further, the use status of the receipt printer can be confirmed, and in that case a receipt can be issued from the selected receipt printer 303a or 303b.

As described above in detail, in accordance with the embodiment, even if one or a plurality of receipt printers is arranged at a position separated from the POS terminal 110 and one or a plurality of receipt printers is used in a shared manner, the receipts are issued in sequence from one or a plurality of receipt printers; however, as the receipt is issued in front of the shop clerk serving as the operator of the POS terminal, it is possible to prevent the receipt from being taken mistakenly.

In the above description, it is described that the barcode scanner 302a is associated with the POS terminal 110a in a one to one manner in advance; however, a random barcode scanner can correspond to the PCS terminal. For example, as shown in FIG. 33, it is assumed that there is a plurality of POS terminals 110 and a plurality of barcode scanners 302 (302a, 302b, 302c, 302d, 302e and 302f) and that the number of the barcode scanners 302 is more than the number of the POS terminals 110.

In the example shown in FIG. 43, the shop clerk A carries the barcode scanner 302a to read a barcode 305 attached to a POS terminal 110 to be used (ACT 410B). Herein, it is assumed that the POS terminal 110a is used, the identification information reading section 222 of the barcode scanner 302a reads the barcode information (identification information 3a) according to the barcode 305a attached to the POS terminal 110a, and the reading device wireless communication section 223 transmits the barcode information (identification information 3a) and the device ID of the barcode scanner 302a to each POS terminal 110 (110a, 110b . . . ) (ACT 420B).

The POS terminal wireless communication section 213 of each POS terminal 110 receives the barcode information (identification information 3a) and the device ID of the barcode scanner 302a (ACT 430B), and each POS terminal 110 determines the association of the POS terminal and the barcode scanner 302a (ACT 440B). That is, the identification information comparison section 215 of each POS terminal 110 refers to an identification information table T2 stored in the storage section 214 to associate the barcode scanner 302a with the POS terminal 110a corresponding to the identification information 3a according to the received barcode information (identification information 3a) and the device ID of the barcode scanner 302a. In this way, the communication between the POS terminal 110a and the barcode scanner 302a is established and the information from the barcode scanner 302a is transmitted to the POS terminal 110a.

After the POS terminal 110a is associated with the barcode scanner 302a, similar to the information output control processing shown in FIG. 4A, an information output control processing can be executed. After the receipt printing information is transmitted, the POS terminal 110a releases the association of the barcode scanner 302a and the POS terminal 110a. Alternatively, if the receipt is issued and receipt issuing completion information from the receipt printer is received, the PUS terminal 110a releases the association of the barcode scanner 302a and the POS terminal 110a.

For example, in a case in which there are plural shop clerks, it is possible that the barcode scanner is distributed to each of the shop clerks to improve efficiency, and meanwhile the number of the POS terminals and that of the receipt printers are both less than that of the barcode scanners to reduce the system setup cost. Further, it is possible that the number of the receipt printers is less than that of the POS terminals to further reduce the system setup cost. Moreover, each shop clerk can correctly receive a desired receipt without mistakes.

The above-mentioned procedures of the controls and the processing can be entirely executed by the software. Thus, through a computer-readable recoding medium in which programs for executing the procedures of the controls and the processing are stored, the foregoing processing and controls can be realized by only executing the programs installed in the control system 100 (for example, the POS terminal).

For example, the control system 100 (for example, the POS terminal) reads the foregoing programs from the computer-readable recoding medium, stores the read programs in a storage device of the storage section 214 and completes the installation of the programs. Alternatively, the control system 100 (for example, the POS terminal) downloads the foregoing programs, stores the downloaded programs in the storage device of the storage section 214 and completes the installation of the programs. In this way, the control system 100 can realize the foregoing processing and controls easily on the basis of the foregoing installed programs.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An information processing system comprising:
a plurality of information processing apparatuses configured to receive codes read by a code reader; and
a plurality of printers connected to the plurality of information processing apparatuses, wherein
upon receiving a first code, which indicates printing information, and a second code, which indicates a target printer in the plurality of printers, each information processing apparatus selects the target printer indicated by the second code and transmits the printing information indicated by the first code to the target printer, and
a total number of printers in the plurality of printers is fewer than a total number of information processing apparatuses in the plurality of information processing apparatuses.

2. The information processing system according to claim 1, wherein
the code reader is a barcode scanner configured to wirelessly transmit the codes to the plurality of information processing apparatuses.

3. The information processing system according to claim 1, wherein
each information processing apparatus is further configured to execute a checkout processing based on identification information corresponding to the first code and generate the printing information based on the checkout processing.

4. The information processing system according to claim 3, wherein
the target printer is configured to print a sales receipt according to the checkout processing.

5. The information processing system according to claim 1, wherein
each of the plurality of information processing apparatuses comprises a code reader.

6. The information processing system according to claim 1, further comprising:
a code reader configured to wirelessly communicate with each of the plurality of information processing apparatuses for transmitting codes read by the code reader.

* * * * *